United States Patent
Herzog

(10) Patent No.: US 6,891,801 B1
(45) Date of Patent: May 10, 2005

(54) METHOD OF OPERATING A DATA TRANSMISSION SYSTEM

(75) Inventor: Christian Herzog, Berlin (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/566,066

(22) Filed: May 5, 2000

(30) Foreign Application Priority Data

May 5, 1999 (DE) .......................................... 199 21 589

(51) Int. Cl.[7] .............................................. H04L 1/16
(52) U.S. Cl. ...................... 370/237; 370/352; 370/392; 370/400; 370/412; 370/416; 709/203; 709/213
(58) Field of Search ................................ 370/237, 352, 370/389, 393, 394, 400, 412, 416, 401, 402, 392, 464, 429, 413, 414, 415, 417, 418, 230.1, 231; 709/203, 213, 217, 218, 219, 201

(56) References Cited

U.S. PATENT DOCUMENTS

| | | | | |
|---|---|---|---|---|
| 4,872,003 A | * | 10/1989 | Yoshida | 340/825.21 |
| 5,548,819 A | * | 8/1996 | Robb | 455/59 |
| 5,610,905 A | * | 3/1997 | Murthy et al. | 370/401 |
| 5,966,431 A | * | 10/1999 | Reiman et al. | 379/115.01 |
| 6,304,569 B1 | * | 10/2001 | Rau | 370/395.2 |
| 6,473,425 B1 | * | 10/2002 | Bellaton et al. | 370/392 |
| 6,493,343 B1 | * | 12/2002 | Garcia et al. | 370/394 |
| 6,507,562 B1 | * | 1/2003 | Kadansky et al. | 370/216 |

FOREIGN PATENT DOCUMENTS

| | | |
|---|---|---|
| DE | 40 21 361 C2 | 1/1992 |
| DE | 43 35 116 A1 | 4/1994 |
| EP | 0 942 555 A2 | 9/1999 |

OTHER PUBLICATIONS

"Intelligent Peripheral (IP) Resource Platform Interface (RPI) Specification", GTE Service Corporation, dated 1995, Version 1.1, pp. 1–82.

* cited by examiner

*Primary Examiner*—Dang Ton
*Assistant Examiner*—Inder Pal Mehra
(74) *Attorney, Agent, or Firm*—Laurence A. Greenberg; Werner H. Stemer; Ralph E. Locher

(57) ABSTRACT

An active partner and a passive partner communicate via a number of parallel data transmission paths by alternately exchanging messages. During the process, a number of the available data transmission paths are initialized and used simultaneously for exchanging messages during normal operation.

7 Claims, 3 Drawing Sheets

METHOD OF OPERATING A DATA TRANSMISSION SYSTEM

BACKGROUND OF THE INVENTION

Field of the Invention

The invention lies in the telecommunications and data transmission fields and relates, more specifically, to the operation of a data transmission system comprising an active partner, also called master, a passive partner, also called slave, and comprising redundant data transmission paths which are also called communication channels. The invention relates especially to the operation of a data transmission system for the higher-level control of a resource platform in network interconnections for telecommunications.

In the field of distributed intelligent networks, one or more dependent computers or data processing facilities (referred to as resource platform), which are to be controlled, can be connected to a higher-level control computer, which is also called "service node controller" (master) by means of a node architecture (so-called "service node architecture"). The master is the computer executing the actual control functions, on which a service, to be implemented, for example, for telephone callers, is programmed. In the context of the present invention, the term 'service' includes a sequencing logic which provides a caller with a particular service (e.g. an information service which is menu-controlled by telephone key input). A resource platform is usually connected to the public switched telephone network (PSTN) and is used for implementing simple functions (such as short announcements, output or input acknowledgment, e.g. of data generated by key operation). Furthermore, during the telecommunication from the resource platform, the message of calls arriving at the platform via a multiplicity of telephone lines can also be signaled to the master.

The communication between master and slave requires interface definitions which regulate the exchange of messages between master and slave. For this purpose, various specifications are known such as, for example, from GTE Telephone Operations, 700 Hidden Ridge Irving, Tex., with the designation "Intelligent Peripheral Resource Platform Interface (IP-RPI)". The messages are usually exchanged on the basis of network protocols, whereby the TCP/IP protocol is widely used (TCP/IP=Transport Control Protocol/Internet Protocol. In principle, however, other protocols can also be used. Communication between master and slave can take place, for example, via a local area network (LAN). According to the above-mentioned specification by the company GTE, no redundancies are provided for these network connections (LAN connections). This has a fatal effect on the communication between master and slave when the LAN connection is faulty. If the LAN connection is interrupted temporarily or for a longer time (for example by destruction of the connecting cable), communication between master and slave, and thus, for example in a telecommunications system, the acceptance and processing of incoming telephone calls, is no longer possible.

In view of this background, it is conceivable to reserve a second or further LAN connections (LAN redundancy) for the sake of safety, to which it is possible to switch, if necessary, if the LAN connection hitherto used is faulty. However, the procedure required for the switchover is relatively elaborate and, due to system conditions, must accept at least a temporary loss of data in the phase in which the faulty condition of the previously used LAN connection is detected, processed further and finally switched over to an alternative LAN connection.

SUMMARY OF THE INVENTION

The object of the invention is to provide a method of operating a data transmission system which overcomes the above-noted deficiencies and disadvantages of the prior art devices and methods of this kind, and which is particularly highly reliable and which, especially in the event of a fault on a data transmission path between a master and a slave, there is no complete loss of messages processed or to be processed at the time.

With the above and other objects in view there is provided, in accordance with the invention, a method of operating a data transmission system, which comprises:
  providing an active partner and a passive partner;
  exchanging messages between the active partner and the passive partner via a plurality of parallel data transmission paths and selectively operating the active partner and the passive partner as a transmitter and as a receiver; and
  initializing and using a plurality of the data transmission paths during the exchange of messages in normal operation.

In other words, the objects of the invention are satisfied by operating a data transmission system comprising an active partner (master) and a passive partner (slave) and comprising a number of parallel data transmission paths via which messages are exchanged between master and slave and which, for this purpose, in each case act as transmitter or receiver, wherein a number of the data transmission paths are initialized and are used for message exchange in normal operation.

As an essential aspect, the method according to the invention is based on the principle of providing a multiplicity of parallel data transmission paths and to use several or all of these for exchanging messages between master and slave in the undisturbed case of operation (normal operation). Due to this measure, it is possible to continue to exchange unimpaired at least portions of the total volume of messages in the case of a fault on one or more data transmission paths.

In accordance with an added feature of the invention, the method includes the following steps:
  duplicating a message to be transmitted, the message being provided with an individual identifier, at a transmitting end in accordance with a number of the data transmission paths being used;
  transmitting the message approximately simultaneously via all data transmission paths being used; and
  at a receiver end, recognizing messages as having been transmitted redundantly on a basis of the identifier and not executing the redundantly transmitted messages.

An embodiment of the method according to the invention which is of advantage in this respect provides that a message to be transmitted, which is provided with an individual identifier, is duplicated at the transmitting end in accordance with the number of data transmission paths used, is transmitted approximately simultaneously via all data transmission paths used and, at the receiver end, messages recognized as having been transmitted redundantly on the basis of the identifier are not processed or executed. Because the message to be transmitted is transmitted redundantly via all available data transmission paths, faults on individual data transmission paths cannot lead to the loss of the message, as long as at least one data transmission path is operating faultlessly. To be able to filter out the redundant messages at the receiver end, for example, a sequence number which is specific to each message can be used. For this purpose, each message has its own individual sequence number which, in the case of an inquiry/response communication between transmitter and receiver, must be mirrored (duplicated) at the responding party in order to ensure an unambiguous correlation at the original transmitter. The sequence numbers can be stored at the receiver and, e.g. in list form, in order to be able to determine from the sequence number of messages newly arriving whether the message has already been transferred on another data transmission path. In principle, a different unambiguous identification of the messages from using their sequence numbers is also conceivable.

An administration of the incoming messages which is preferred in this respect can be implemented in the method according to the invention by the fact that, at the receiver end, an incoming message is compared, by means of its identifier, with a checklist which contains the identifiers of messages received within a past period, to see whether a message with the identical identifier has already been received, and when the result of the comparison is negative, the message is released for further processing and the checklist is updated by an appropriate entry of the identifier of this message or, if the result of the comparison is positive, the incoming message is not released for further processing. The message can also be deleted from the list automatically later after a certain time or immediately after arrival of the redundant message. To be able to implement the method steps described above in a preferred manner in the form of hardware (ASIC), corresponding circuits could be provided downstream of the transmitter or upstream of the receiver. The circuit at the transmitter end automatically duplicates the message initially only provided singly by the respective transmitter and then applies it to all data transmission paths used. Correspondingly, a circuit must be installed at the opposite end (receiver) which there filters out the messages received redundantly and recombines the message streams into a single data stream.

Having regard to the highest possible system flexibility and for reasons of cost, a method embodiment is advantageous which can be implemented by computer program steps. An embodiment of the method according to the invention which is preferred in this respect provides that messages to be transmitted are distributed at the transmitting end in accordance with a distribution rule to the data transmission paths used so that only a proportion of the total volume of messages is transmitted via each data transmission path used. Here, too, all available data transmission paths are included in managing the exchange of messages. This can be implemented by programming, for example at the receiver end, by reading sequentially at high speed and thus in a quasi-parallel manner from a number of inputs (sockets) of the receiver by means of program instructions known per se ("select"). At the transmitting end and at the receiver end, a scheduler is provided for this purpose which distributes the messages to be transmitted to all data transmission paths connected or, respectively, used, in accordance with a certain algorithm. In the simplest case, the algorithm can effect a round robin type of distribution.

An especially preferred algorithm for selecting the data transmission path in each case currently used for a message is as follows:

$$n = \text{identifier} \bmod(N), \text{ where}$$

n designates the number of the data transmission path to be used;

identifier is the allocation of a message to a process or to a transaction; and

N is the number of available data transmission paths.

The identifier used for messages, e.g. in the field of telecommunications, can be the respective number of the telephone channel (port number) via which the respective process (transaction) is taking place, e.g. when setting up the connection.

To be able to detect the failure of one or more data transmission paths in a particularly reliable manner, a preferred further development of the invention provides that the master transmits to the slave heartbeat messages with request for acknowledgment at time intervals via all data transmission paths used, that the arrival of the requested acknowledgments is monitored by the master and evaluated in such a manner that, when acknowledgments fail to arrive, the associated transmission path is declared as temporarily no longer usable and the declaration of unusable and/or usable data transmission paths is transferred to the slave.

This embodiment of the invention takes into account the problem that the slave cannot easily infer from heartbeat messages failing to arrive—within a predetermined time— that the associated data transmission path is faulty. This is because a supposed lack of heartbeat messages within the predetermined time can also be based on the fact that the frequency of the heartbeat messages—as an alterable parameter of the master—has been reduced but the test operation per se operates faultlessly. This is why, advantageously, the transmission of information, for example in list form, is provided via the data transmission paths which are in each case currently usable, i.e. active. This information transmission from master to slave can take place as an extra message or particularly advantageously together with the heartbeat messages. After reception of the declaration which has been updated in each case, the slave blocks the respective transmission paths which have been declared as unusable for messages to be output by it. A matching or compatible identification and designation of the data transmission paths by the master on the one hand, and the slave, on the other hand, can be determined by simple configuration of the master and the slave. The available data transmission paths can be consecutively numbered with integral numbers in ascending order so that the declaration or list of usable data transmission paths to be transmitted is a series of integral numbers; the number of the unusable data transmission paths which are faulty in each case is then no longer contained in the list.

When heartbeat messages fail to arrive, the slave can respond even more quickly, according to an advantageous embodiment of the invention, in that the master approximately simultaneously transmits to the slave the same heartbeat message with request for acknowledgment at time intervals via all data transmission paths used, the slave, on first reception of the heartbeat message via a first one of the data transmission paths, monitors the remaining data transmission paths used to see whether the same heartbeat message is also arriving on these and, after a waiting time running from the initial reception has lapsed, the slave classifies those data transmission paths on which the same heartbeat message has not been received within the waiting time as temporarily no longer usable.

In this case, the same heartbeat message is transmitted via each data transmission path so that the slave can evaluate the heartbeat messages (preferably within a time frame). Thus, it is possible to set a timing element, for example after the first reception of a special heartbeat message, after the time-out of which element, when further identical heartbeat messages expected via other data transmission paths fail to arrive, it is assumed that the relevant data transmission path is not operable. In this case, the (temporary) blocking of the data transmission paths is, if necessary, is effected by the slave itself.

In addition, the master, in turn, after sending out the heartbeat messages, expects the requested acknowledgments within a short period of time; if these fail to arrive on one or more data transmission paths, the master, too, correspondingly blocks the respective data transmission paths. An advantage of this variant is that the slave does not have to rely on the available data transmission paths being transferred. Naturally, alternative or combined applications of the checking methods described above are possible.

Other features which are considered as characteristic for the invention are set forth in the appended claims.

Although the invention is illustrated and described herein as embodied in a method for operating a data transmission system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
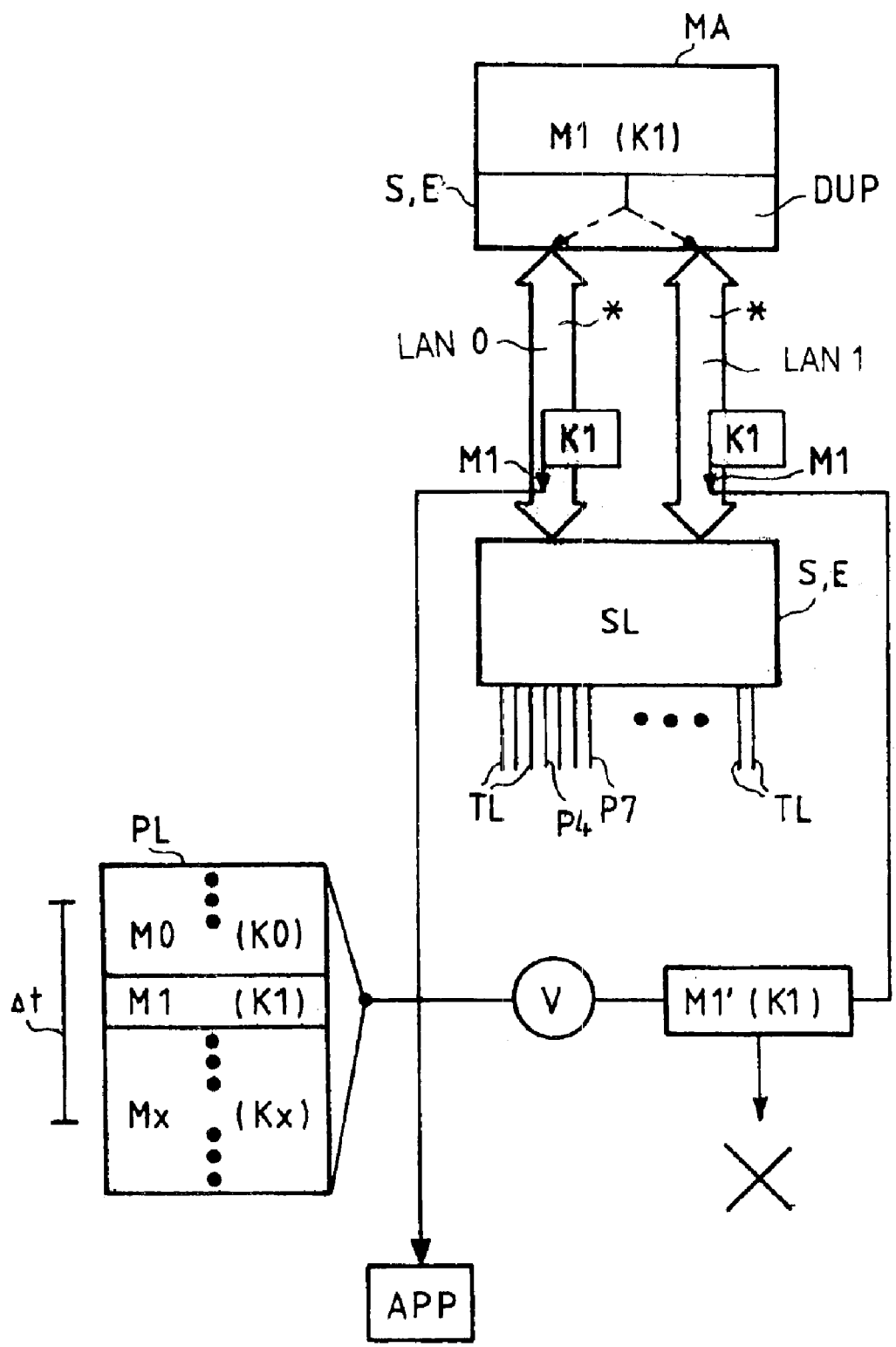
FIG. 1 is a schematic diagram of a data transmission system according to the invention.

Referring now to the figures of the drawing in detail and first, particularly, to FIG. 1 thereof, there is seen a data transmission system comprising an active partner MA (master) and a passive partner SL (slave). Bidirectional communication (message or data exchange) is possible between the master and the slave via a number of parallel data transmission paths LAN0, LAN1. In the illustrative embodiment, only two data transmission paths are shown for the sake of clarity; naturally, more data transmission paths can also be initialized. Operationally, the master and the slave exchange a multiplicity of messages via the data transmission paths initialized and set up. The initialization and the activation is identified by the asterisk "*". In this arrangement, master and slave in each case operate alternately as transmitter S and receiver E. The slave is connected to a multiplicity of data lines at its input, via which messages from outside (e.g. incoming telephone calls) can reach the slave. The data lines can be, for example, telephone lines TL and be connected to a multiplicity of input ports. The ports P4 and P7 are designated by way of example.

For the following explanation it will be assumed that the master MA has to transfer a message M1 to the slave SL.

The message M1 generated by the master is initially available only singly and is duplicated in an internal duplicator DUP. Thus, the message M1 is transferred to the slave both via the first data transmission path LAN0 and via the second data transmission path LAN1. The message M1 contains an identifier K1 so that the identity of the message M1 can be determined unambiguously at the receiver end. In this case, of course, the slave is the receiver.

To process or forward—for example to an application APP—the duplicated messages arriving in multiples only in the case of the first arrival, the identifiers of the incoming messages are evaluated by the slave. For this purpose, all incoming messages and their identifier are deposited in a checklist PL.

For example, the checklist PL shows the messages M0, M1 and Mx with their individual identifiers K0, K1, Kx to be considered during a period $\Delta t$. It is assumed that message M1 has arrived first at the slave SL via the data transmission path LAN0 and then been entered in the checklist PL and also forwarded to the application APP. A short time thereafter (the periods considered here are of the order of milliseconds to seconds), it is assumed that the message M1 has again arrived at the slave—this time via the transmission path LAN1. The message designated as M1'only for distinguishing purposes is compared by means of its identifier K1 with the content of the checklist PL by a comparator V. During this process, it is determined from the identifier K1 that the message M1 has already arrived (advantageously also been immediately forwarded). Accordingly, there is no further processing or forwarding of the message M1'. If the message M1 had not yet arrived, it would be entered for the first time in the checklist PL at this time and forwarded to the application APP.

Figure 2:
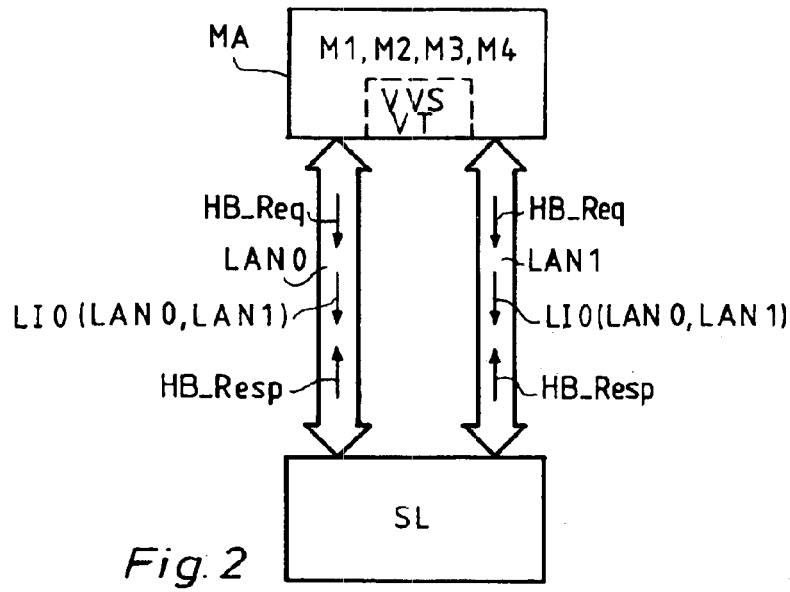
FIG. 2 is a schematic diagram illustrating a possible way of distributing messages to be transmitted to different data transmission paths.

FIG. 2 shows an embodiment of the method according to the invention in which the messages to be transmitted between the master MA and the slave SL are distributed to the available activated and initialized data transmission paths LAN0, LAN1. For this purpose, a distribution rule VVS is used which, for example, distributes the messages in accordance with their association with a transaction by means of the port identifier. By way of example, messages M1 to M4 are indicated which are distributed according to the distribution rule VVS: n=pn modN=pn mod2 in a scheduler VT. Here, pn specifies the port number (1 to 4 in this case) of the message and N designates the number of available data transmission paths (N=2 in this case); n is the number of the data transmission path to be used for the respective message. All messages that are associated with a transaction—e.g. the telephone call via a line (e.g. No. 4)—receive the number (e.g. 4) of the line (port) as identifier.

According to the modulo function, the following relation is given, for example for a message M3 (associated with the port 3):

3mod2=1; for message M4 (associated with port 4), the result is:

4mod2=0.

The allocations of 1 or, respectively, 0 resulting from this function are correspondingly associated with the data transmission paths so that all messages with scheduler function 0 are associated with transmission path LAN0 and with 1 are associated with transmission path LAN1. Given this distribution function, a very elegant uniform distribution is given, especially when there are more than two data transmission paths.

As a regular check of the operability of the data transmission paths, heartbeat messages HB containing a respective acknowledgment request REQ are transmitted at predetermined time intervals T (cf. FIG. 3) from the master MA to the slave SL via all data transmission paths LAN0, LAN1 used in accordance with the embodiment of the method according to the invention shown in FIG. 2. When the respective heartbeat message HB_Req is received, the slave preferably returns the requested acknowledgment HB_Resp on the same data transmission path. At the master's end, the arrival of the requested acknowledgments is monitored and evaluated. In this process, a waiting time is preferably predetermined within which the acknowledgments must arrive in order to declare the respective transmission path as usable. If the requested acknowledgments of one or more data transmission paths fail to arrive within the waiting time, the respective data transmission path is declared temporarily no longer usable. This declaration is edited, for example in the form of a current in-operation list LIO, and transferred to the slave SL via the transmission paths LAN0 and LAN1. This declaration can be preferably communicated together with the heartbeat messages. After a further time interval T has elapsed, heartbeat messages with acknowledgment request are again transmitted to the slave so that the declarations are periodically updated.

In the illustrative embodiment shown in FIG. 2, the data transmission paths are unimpaired and thus both are marked as operable (LIO(LAN0, LAN1)).

Figure 3:
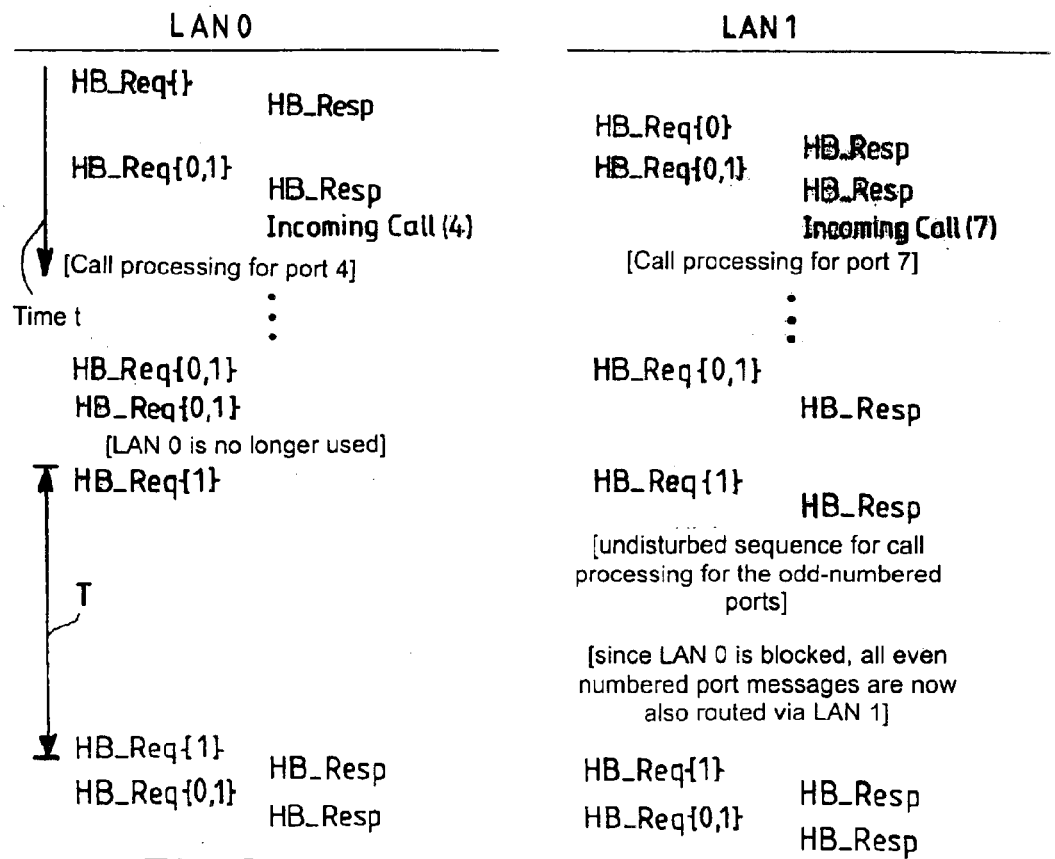
FIG. 3 is a sequential flow instruction showing an example of monitoring the data transmission paths which are used, in accordance with the method according to the invention.

This state is also shown in FIG. 3 at the beginning of a timing diagram. The message exchange via transmission path LAN0 is shown on the left-hand side and via transmission path LAN1 on the right-hand side. At first, the master MA sends a heartbeat message with acknowledgment request HB_Req to the slave SL on the data transmission path LAN0 as described. As expected, the slave responds with the acknowledgment HB_Resp. Accordingly, the master then transmits the heartbeat message HB_Req{0}, to which the information is already appended that the transmission path LAN0 is operable, to the slave via the data transmission path LAN1. This is indicated by the appended {0} in FIG. 3.

Here, too, the slave responds with the expected acknowledgment HB_Resp via transmission path LAN1, so that during subsequent checking cycles the information that both data transmission paths LAN0, LAN1 are operable (represented by {0,1}) is appended to the heartbeat message HB_Req. In this state, calls arriving, for example, via port 4 or port 7 (FIG. 1) can be processed ("call processing").

For the further explanation it will now be assumed that a fault occurs on transmission path LAN0 in the further progress of the method. During the next routine heartbeat message HB_Req, the expected acknowledgment HB_Resp does not occur via transmission path LAN0. On the other hand, the expected acknowledgment HB_Resp is present via transmission path LAN1 following the heartbeat message HB_Req. If necessary, it is possible to wait for another unsuccessful attempt or to declare the transmission path LAN0 as not usable immediately. The heartbeat message with appended declaration HB_Req{1} on the usable data transmission paths, therefore, now only contains transmission path LAN1 (represented by {1}). As a result, a faultless sequence of all processing operations is now temporarily only possible for the odd-numbered ports associated with transmission path LAN1. In the example according to FIG. 2, thus, e.g. for M1, M3. Since transmission path LAN0 has now been declared blocked or not usable, respectively, all messages with even-numbered indentifier (port identifier) (e.g. M2, M4, compare FIG. 2) are now also conducted via data transmission path LAN1.

As shown in the bottom section of FIG. 3, the heartbeat messages are still routinely output at predetermined time intervals T and, in the illustrative embodiment, the requested acknowledgment HB_Resp is now also again received via data transmission path LAN0 so that subsequently both data transmission paths LAN0 and LAN1 are again marked as available and are reported as available to the slave. Accordingly, the messages are again distributed to both transmission paths.

Figure 4:
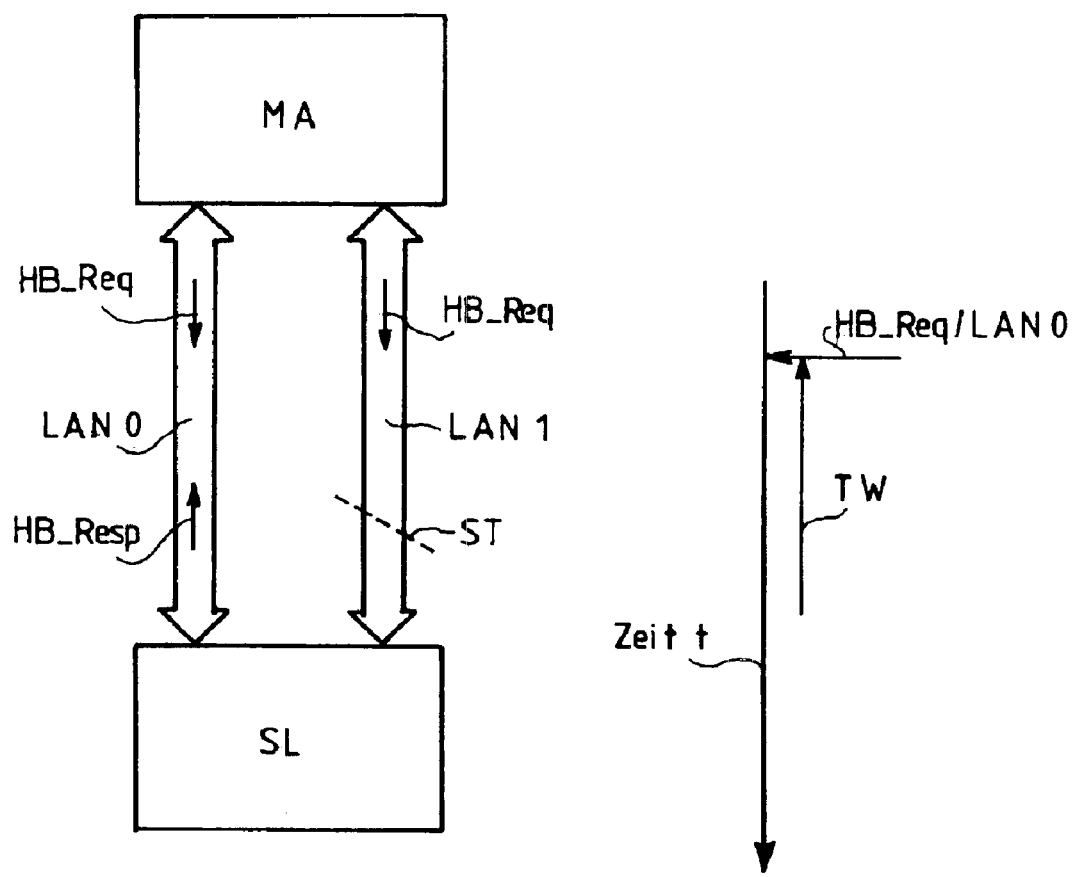
FIG. 4 is a schematic diagram of a possible way of detecting a faulty data transmission path in the context of the method according to the invention.

FIG. 4 shows a variant in which the master MA transmits the same heartbeat message HB_Req with acknowledgment request approximately simultaneously to the slave SL via all data transmission paths LAN0, LAN1 at time intervals T (compare FIG. 3). On first receiving the heartbeat message, which has arrived via a first data transmission path LAN0 used, the slave SL monitors the remaining data transmission paths LAN1 used to see whether the same heartbeat message HB_Req is also received on those. After a waiting time TW has elapsed, the slave SL classifies those data transmission paths LAN1 on which the same heartbeat message HB has not been received within the waiting time TW as temporarily no longer usable. In the illustrative embodiment according to FIG. 4, this applies to data transmission path LAN1 which is interrupted by a fault ST. Due to the fault ST, the heartbeat message has not reached the slave SL within the waiting time TW via this data transmission path LAN1. For this reason, the slave SL itself marks this data transmission path as not usable or, respectively, blocked, until further notice. The slave, therefore, no longer transmits any messages via this data transmission path LAN1 until further notice. On the other hand, the acknowledgment HB_Resp transmitted by the slave via data transmission path LAN0 reaches the master MA. In contrast, no acknowledgment reaches the master MA on the other data transmission paths LAN1. Thus, the master MA also reaches the same level of knowledge with respect to the available data transmission paths as the slave SL a short time later. The advantage of this variant lies in the fact that the master does not first have to supply the slave with a list of available connections. This variant can be combined with the aforementioned algorithms and checking methods.

Thus, a significant aspect of the invention can be seen in the fact that in the case of a—preferably uniform—distribution of the messages to be transmitted via n data transmission paths, only a portion of m/n messages fails in the case of a fault on m data transmission paths. In the case of a two-track data transmission as shown, advantageously only all ports with even-numbered or, respectively, odd-numbered port numbers will fail for a short time until the master or, respectively, the slave notices the failure, blocks the faulty connection and divert to the data transmission paths still operating.

I claim:

1. A method of operating a data transmission system: which comprises: providing an active partner and a passive partner;

exchanging messages between the active partner and the passive partner via a plurality of parallel data transmission paths and selectively operating the active partner and the passive partner as a transmitter and as a receiver; and initializing and using a plurality of the data transmission paths during the step of exchanging messages in normal operation;

duplicating a message to be transmitted in accordance with a number of the data transmission paths being used, the message being provided with an individual identifier, at a transmitting end;

transmitting the message approximately simultaneously via all data transmission paths being used; and at a receiver end, recognizing messages as having been transmitted redundantly on a basis of the identifier and not executing the redundantly transmitted messages.

2. The method according to claim 1, which comprises:

at the receiver end, comparing an incoming message, by using the identifier, with a checklist containing the respective identifier of each of a plurality of messages received within a past period, to check whether a message with a given identical identifier has already been received;

if a result of the comparing step is negative, releasing the message for further processing and updating the checklist with an appropriate entry of the identifier of the message; and if the result of the comparing step is positive, not releasing the incoming message for further processing.

3. The method according to claim 1, which comprises distributing messages to be transmitted at a given one of the active partner and the passive partner acting as the transmitter in accordance with a given distribution rule to the data transmission paths used so that only a proportion of a total volume of messages is transmitted via each data transmission path used.

4. The method according to claim 3, which comprises:

transmitting heartbeat messages from the active partner to the passive partner with request for acknowledgment at time intervals via all data transmission paths used;

monitoring with the active partner an arrival of requested acknowledgments and evaluating such that, when a certain acknowledgment fails to arrive, declaring a given one of the data transmission paths associated with the certain acknowledgement as temporarily unusable;

transferring a declaration of one of unusable and usable data transmission paths to the passive partner.

5. The method according to claim 4, wherein the declaration is transferred together with the heartbeat messages.

6. The method according to claim 3, which comprises:

transmitting a heartbeat message with a request for acknowledgment from the active partner to the passive partner approximately simultaneously at time intervals via all the data transmission paths used;

upon a first reception of the heartbeat message via a first one of the data transmission paths, monitoring with the passive partner remaining data transmission paths used to see whether the heartbeat message is also arriving on the remaining data transmission paths; and after a waiting time from an initial reception has elapsed, classifying with the passive partner those data transmission paths on which the heartbeat message has not been received within the waiting time as temporarily unusable.

7. A method of operating a data transmission system, which comprises:

providing an active partner and a passive partner;

exchanging messages between the active partner and the passive partner via a plurality of parallel data transmission paths and selectively operating the active partner and the passive partner as a transmitter and as a receiver;

initializing and using a plurality of the data transmission paths during the step of exchanging messages in normal operation;

distributing messages to be transmitted at a given one of the active partner and the passive partner, acting as the transmitter in accordance with a given distribution rule, to the data transmission paths used for transmitting only a proportion of a total volume of messages via each data transmission Path used; and defining the given distribution rule as:

$$n = \text{identifier mod}(N), \text{ where}$$

n designates a number of the data transmission paths to be used;

identifier is a number for allocating each of the messages to a process or to a transaction; and N is a number of available data transmission paths.

* * * * *